(12) United States Patent
Jin et al.

(10) Patent No.: US 7,648,595 B2
(45) Date of Patent: Jan. 19, 2010

(54) METHODS OF MAKING NANOPRISMS

(75) Inventors: Rongchao Jin, Evanston, IL (US);
Yunwei Cao, Gainesville, FL (US);
Chad A. Mirkin, Wilmette, IL (US)

(73) Assignee: Northwestern University, Evanston, IL (US)

( * ) Notice: Subject to any disclaimer, the term of this patent is extended or adjusted under 35 U.S.C. 154(b) by 131 days.

(21) Appl. No.: 11/499,024

(22) Filed: Aug. 4, 2006

(65) Prior Publication Data

US 2009/0308202 A1 Dec. 17, 2009

Related U.S. Application Data

(62) Division of application No. 10/256,875, filed on Sep. 26, 2002, now Pat. No. 7,135,054.

(60) Provisional application No. 60/325,293, filed on Sep. 26, 2001.

(51) Int. Cl.
*B22F 9/00* (2006.01)

(52) U.S. Cl. .................. 148/513; 75/345; 977/773; 977/810

(58) Field of Classification Search .................. 148/513
See application file for complete search history.

(56) References Cited

U.S. PATENT DOCUMENTS

| | | | |
|---|---|---|---|
| 4,916,052 A | 4/1990 | Irving et al. | |
| 5,013,641 A | 5/1991 | Buntaine et al. | |
| 5,034,313 A | 7/1991 | Shuman | |
| 5,061,616 A | 10/1991 | Piggin et al. | |
| 5,250,408 A | 10/1993 | Chang et al. | |
| 6,120,588 A | 9/2000 | Jacobson | |
| 6,180,415 B1 | 1/2001 | Schultz et al. | |
| 6,323,989 B1 | 11/2001 | Jacobson et al. | |
| 6,422,687 B1 | 7/2002 | Jacobson | |
| 6,538,801 B2 | 3/2003 | Jacobson et al. | |
| 6,608,716 B1 * | 8/2003 | Armstrong et al. | .......... 359/342 |
| 6,855,202 B2 | 2/2005 | Alivisatos et al. | |
| 6,972,173 B2 | 12/2005 | Su et al. | |
| 7,033,415 B2 * | 4/2006 | Mirkin et al. | .................. 75/345 |
| 2002/0015150 A1 * | 2/2002 | Armstrong et al. | .......... 356/301 |

(Continued)

OTHER PUBLICATIONS

Jin, R. et al., "Photoinduced Conversion of Silver Nanospheres to Nanoprisms", Science, vol. 294, pp. 1901-1903, Nov. 30, 2001.*

(Continued)

*Primary Examiner*—George Wyszomierski
(74) *Attorney, Agent, or Firm*—Marshall, Gerstein & Borun LLP (57) ABSTRACT

The invention is a novel photo-induced method for converting large quantities of silver nanospheres into nanoprisms, the nanoprisms formed by this method and applications in which the nanoprisms are useful. Significantly, this light driven process results in a colloid with a unique set of optical properties that directly relate to the nanoprism shape of the particles. Theoretical calculations coupled with experimental observations allow for the assignment of the nanoprism plasmon bands and the first identification of two distinct quadrupole plasmon resonances for a nanoparticle. Finally, unlike the spherical particles from which they derive and which Rayleigh light scatter in the blue, these nanoprisms exhibit scattering in the red, permitting multicolor diagnostic labels based not only on nanoparticle composition and size but also on shape.

28 Claims, 7 Drawing Sheets

U.S. PATENT DOCUMENTS

| | | |
|---|---|---|
| 2002/0061363 A1 | 5/2002 | Halas et al. |
| 2002/0192687 A1 | 12/2002 | Mirkin et al. |
| 2003/0022169 A1 | 1/2003 | Mirkin et al. |
| 2005/0007001 A1 | 1/2005 | Imholt et al. |
| 2006/0014001 A1 | 1/2006 | Zhang et al. |

OTHER PUBLICATIONS

Ahmandi et al., "Shape-Controlled Synthesis of Colloidal Platinum Nanoparticles", *Science*, 272:1924-1926 (1996).

Bradley et al., "Surface Spectroscopic Study of the Stabilization Mechanism for Shape-Selectively Synthesized Nanostructured Transition Metal Colloids", *J. Am. Chem. Soc.*, 122:4631-4636 (2000).

Henglein, "Reduction of $Ag(CN)_2^-$ on Silver and Platinum Colloidal Nanoparticles", *Langmuir*, 17:2329-2333 (2001).

Hulteen et al., "Nanosphere lithography: A materials general fabrication process for periodic particle array surfaces", *J. Vac. Sci. Technol. A.*, 13(3):1553-1558 (1995).

Jensen et al., "Nanosphere Lithography: Tunable Localized Surface Plasmon Resonance Spectra of Silver Nanoparticles", *J. Phys. Chem. B.*, 104(45):10549-10556 (Oct. 2000).

Jensen et al., "Nanosphere Lithography: Effect of the External Dielectric Medium on the Surface Plasmon Resonance Spectrum of a Periodic Array of Silver Nanoparticles", *J. Phys. Chem. B.*, 103:9846-9853 (1999).

Kamat et al., "Picosecond Dynamics of Silver Nanoclusters. Photoejection of Electrons and Fragmentation", *J. Phys. Chem. B.*, 102:3123-3128 (1998).

Klasu et al., "Silver-based crystalline nanoparticles, microbially fabricated", *Proc. Nat'l. Acad. Sci. USA*, 96:13611-13614 (1999).

*Lange's Handbook of Chemistry*, eleventh edition, McGraw-Hill, pp. 3-122 (1973).

Li et al., "Coupled synthesis and self-assembly of nanoparticles to give structures with controlled organization", *Nature*, 402:393-395 (1999).

Manna et al., "Synthesis of Soluble and Processable Rod-, Arrow-, Teardrop-, and Tetrapod-Shaped CdSe Nanocrystals", *J. Am. Chem. Soc.*, 122:12700-12706 (2000).

Peng et al., "Shape control of CdSe nanocrystals", *Nature*, 404:59-61 (2000).

Pinna et al., "Triangular CdS Nanocrystals: Structural and Optical Studies", *Ad. Mater.*, 13:261-264 (2001).

Procházka et al., "Probing Applications of Laser-Ablated Ag Colloids in SERS Spectroscopy: Improvement of Ablation Procedure and SERS Spectral Testing", *Anal. Chem.*, 69:5103-5108 (1997).

Puntes et al., "Colloidal Nanocrystal Shape and Size Control: The Case of Cobalt", *Science*, 291:2115-2117 (2001).

Saito et al., "A Simple Chemical Method for the Preparation of Silver Surfaces for Efficient SERS", Langmuir, 18(8):2959-2961 (Apr. 16, 2002).

Smith et al., "Spectral response of plasmon resonant nanoparticles with a non-regular shape", *Optics Express*, 6(11):213-219 (2000).

Yang et al., "Discrete dipole approximation for calculating extinction and Raman intensities for small particles with arbitrary shapes", *J. Chem. Phys.*, 103:869-875 (1995).

\* cited by examiner

METHODS OF MAKING NANOPRISMS

CROSS-REFERENCE TO RELATED APPLICATIONS

This is a divisional of U.S. patent application Ser. No. 10/256,875, filed Sep. 26, 2002, now U.S. Pat. No. 7,135,054, which claims benefit of U.S. Provisional Patent Application Ser. No. 60/325,293, filed Sep. 26, 2001, each of which is incorporated herein.

FIELD OF THE INVENTION

The invention resides in the field of nanoprisms having unique optical properties produced by a photo-induced method.

BACKGROUND OF THE INVENTION

Size is an important parameter in nanoscale materials that can provide control over many of their physical and chemical properties, including luminescence, conductivity, and catalytic activity. Over the past century, colloid chemists have gained excellent control over particle size for several spherical metal and semiconductor compositions. This chemical control over particle size has led to the discovery of quantum confinement in colloidal nanocrystals and their exploitation as probes in biological diagnostic applications, LED materials, lasers, and Raman spectroscopy enhancing materials. In contrast, the challenge of synthetically controlling particle shape has been met with limited success. Nevertheless, some physical and solid-state chemical deposition methods have been developed for making semiconductor and metal nanowires, nanobelts, and dots, and there are now a variety of methods for making rods with somewhat controllable aspect ratios using electrochemical and membrane-templated syntheses.

Less is known with respect to solution synthetic methods for non-spherical particles such as triangles or cubes. However, methods do exist for making colloidal samples of Pt cubes and pyramids (Ahmandi et al., *Science* 272:1924 (1996)), and PbSe, CdS, and Ni triangles (Fendler et al., *J. Am. Chem Soc.* 122:4631 (2000), Pinna et al., *Ad. Mater.* 13:261 (2001), Klasu et al., *Proc. Natl. Acad. Sci U.S.A.* 96:13611 (1999)). Promising recent work has resulted in methods for synthesizing $BaCrO_4$, CdSe and Co nanorods and distributions of arrow-, teardrop-, and tetrapod-shaped CdSe nanocrystals (Li et al., *Nature* 402:393 (1999), Peng et al., *Nature* 404:59 (2000), Puntes et al., *Science* 291:2115 (2001), Manna et al., *J. Am. Chem. Soc.* 122:12700 (2000)). All of these solution methods are based on thermal processes, and in most cases, with the exception of rods, yield relatively small quantities of the desired particle shape. However, much like particle size-control in nanoscale materials led to the discovery of new and important fundamental science and technological applications in diagnostics, optics, catalysis, and electronics, synthetic methods that lead to control over particle shape can be expected to lead to important fundamental as well as technological advances. Therefore, the development of bulk solution synthetic methods that offer control over particle shape is of paramount importance if the full potential of these novel materials is to be realized.

SUMMARY OF THE INVENTION

One embodiment of the invention provides a method of forming nanoprisms by exposing a suspension of non-crystalline silver particles to light having a wavelength of less than about 700 nm to form silver crystals. The method uses a wavelength of light between about 350 nm and about 700 nm. The suspension may comprise a reducing agent, a stabilizing agent, and a surfactant and the light exposure may be intermittent or continue over hours, days, weeks or longer. The suspension may also be stably maintained in the absence of light having a wavelength of less than about 700 nm.

Another embodiment of the present invention is a method of forming nanoprisms by fragmenting silver nanoparticles in suspension by exposure to light, growing silver nanoprisms by continued exposure to light and then terminating the growth of the silver nanoprisms. Preferably, the light has a wavelength of between about 350 nm and about 700 nm and the growth is continued for a period of greater than 50 hours. The growth can be terminated by preventing further exposure of the suspension to light or by consuming the silver nanoparticles feeding the growth. The suspension may comprise a reducing agent, a stabilizing agent, and a surfactant and the light exposure may be intermittent or continue over hours, days, weeks or longer. The suspension may also be stably maintained in the absence of light having a wavelength of less than about 700 nm.

Another embodiment of the invention is a silver nanoprism comprising a single silver crystal having a lattice spacing of 1.44 Å and an edge length of between about 10 nm and about 60 nm. The nanoprism typically has a triangular shape with an atomically flat top and bottom. The nanoprism may also have an in-plane dipole plasmon resonance of 770 nm or an out-of-plane dipole plasmon resonance of 410 nm, or an in-plane quadrupole resonance of 470 nm, or an out-of-plane quadrupole resonance of 340 nm or any combination of these characteristics. A further embodiment of the present invention is a silver nanoprism having a tip of the prism is removed. These nanoprisms, may exhibit Rayleigh scattering in the red.

Another embodiment of the present invention is a nanoparticle label based on a silver nanoprism. The label has a triangular shape with an atomically flat top and bottom. The nanoprism label may also have an in-plane dipole plasmon resonance of 770 nm or an out-of-plane dipole plasmon resonance of 410 nm, or an in-plane quadrupole resonance of 470 nm, or an out-of-plane quadrupole resonance of 340 nm or any combination of these characteristics. A further embodiment of the present invention is a silver nanoprism having a tip of the prism is removed. These nanoprisms, may exhibit Rayleigh scattering in the red.

DETAILED DESCRIPTION OF THE INVENTION

The present invention is a unique photo-induced method for synthesizing large quantities of metal nanoprisms in high yield in the form of a colloidal suspension. Importantly, this photo-mediated route has led to a colloid with a unique set of optical properties that directly relate to the shape control afforded by this novel preparatory method.

In one embodiment of the invention, nanoprisms are formed by exposing a suspension of spherical silver particles to light having a wavelength of less than 700 nm. The reaction that transforms the spherical particles into nanoprisms is initiated by the exposure to light. Exposure to light in the range of about 350 nm to about 700 nm, such as the light from a 40 W fluorescent bulb or tube, is preferred. The reaction is not initiated in the dark or by exposure to light having a wavelength greater than about 700 nm (near-IR light) and the starting suspension is stable as spherical particles for at least two months when protected from light. Therefore, the reaction which results in nanoprisms can be selectively turned on or off simply by controlling the exposure of the colloid to light of the appropriate wavelength.

The silver salt precursor forming the silver source in suspension may be any silver salt capable of dissolution in the selected suspension medium. For example, $AgNO_3$ and $AgClO_4$ perform comparably as a silver source for the suspension in an aqueous solution. Preferably $AgNO_3$ is used in a 0.1 mM aqueous solution. Additionally, a reducing agent is optionally added to the suspension to aid in formation of the suspension. Preferably, the reducing agent is $NaBH_4$ in a final concentration of 0.5 mM that may be added in dropwise increments.

The surfactant used to form the suspension of nanospheres may vary widely in concentration without affecting the extent of the conversion of nanospheres to nanoprisms. However, the reaction rate is affected by surfactant and provides an additional means of controlling the conversion reaction based on the conversion rate. Preferably, trisodium citrate is present as a surfactant in the suspension of silver nanospheres and bis(p-sulfonatophenyl) phenylphosphine dihydrate (BSPP) is added to the suspension as a particle stabilizing agent. Although the nanoprisms are formed over the entire range of surfactant concentration, the rate of the conversion reaction decreases as a function of increasing the ratio of BSPP to citrate over a range of about 0.01 to about 1. The most rapid conversion rate is obtained at a BSPP to citrate ratio of 0.3:1. Thus, the reaction rate may be optimized by varying the surfactant concentration and the ratio of the surfactant to a stabilizing agent added to the suspension.

Figure 1:
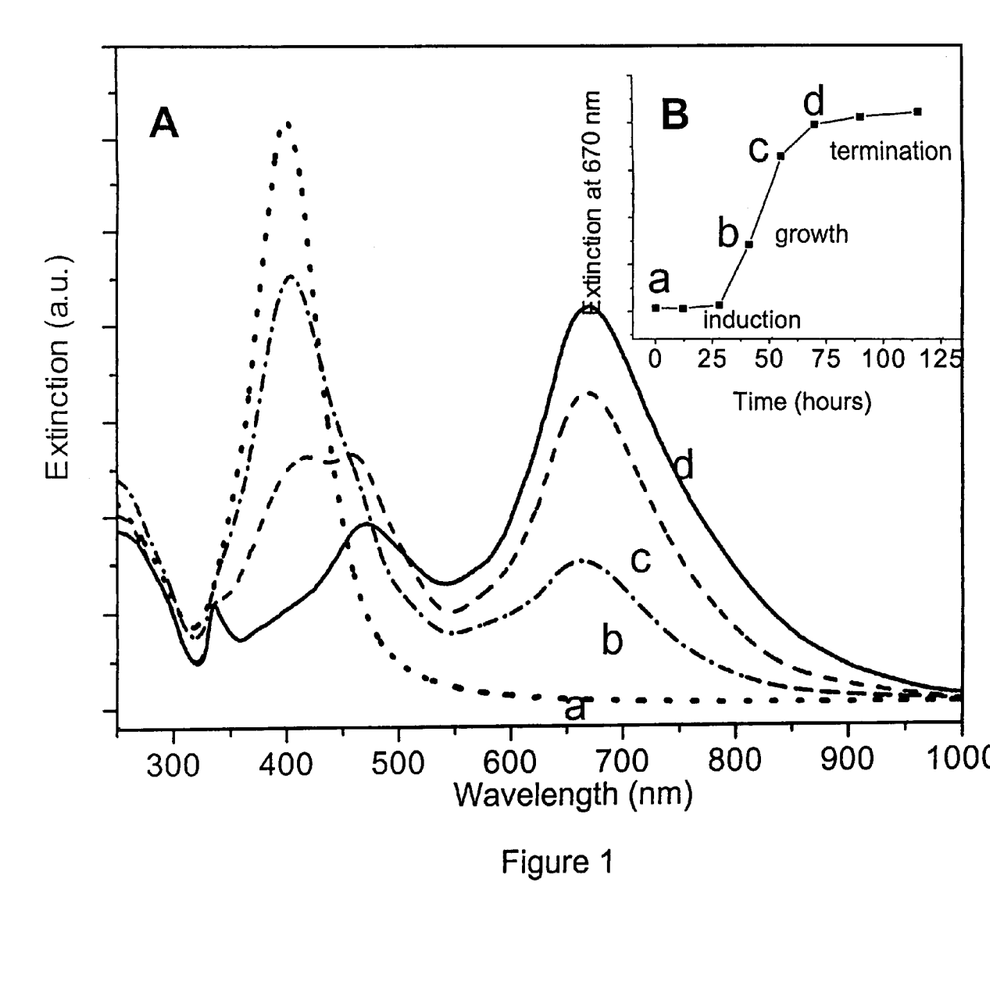
FIG. 1 shows time-dependent UV-vis spectra showing the conversion of silver nanospheres to nanoprisms: (A) before irradiation, (B) after 40 h of irradiation, (C) after 55 h of irradiation, (D) after 70 h of irradiation. The inset shows the extinction profile at 670 nm as a function of time.

After formation of the suspension and exposure to light of the correct wavelength the solution initially turns yellow, characteristic of the spherical particles, but over a time period that can be controlled by suspension characteristics and light exposure, the suspension turns green and then finally blue. As shown in FIG. 1, using UV-vis spectroscopy, the characteristic surface plasmon band for the spherical particles at $\lambda_{max}$=400 nm decreases in intensity with a concomitant growth of three new bands with $\lambda_{max}$=335 (weak), 470 (mediate), 670 nm (strong) respectively. As the conversion of the nanospheres to nanoprisms nears completion, the band at 400-nm completely disappears.

Figure 2:
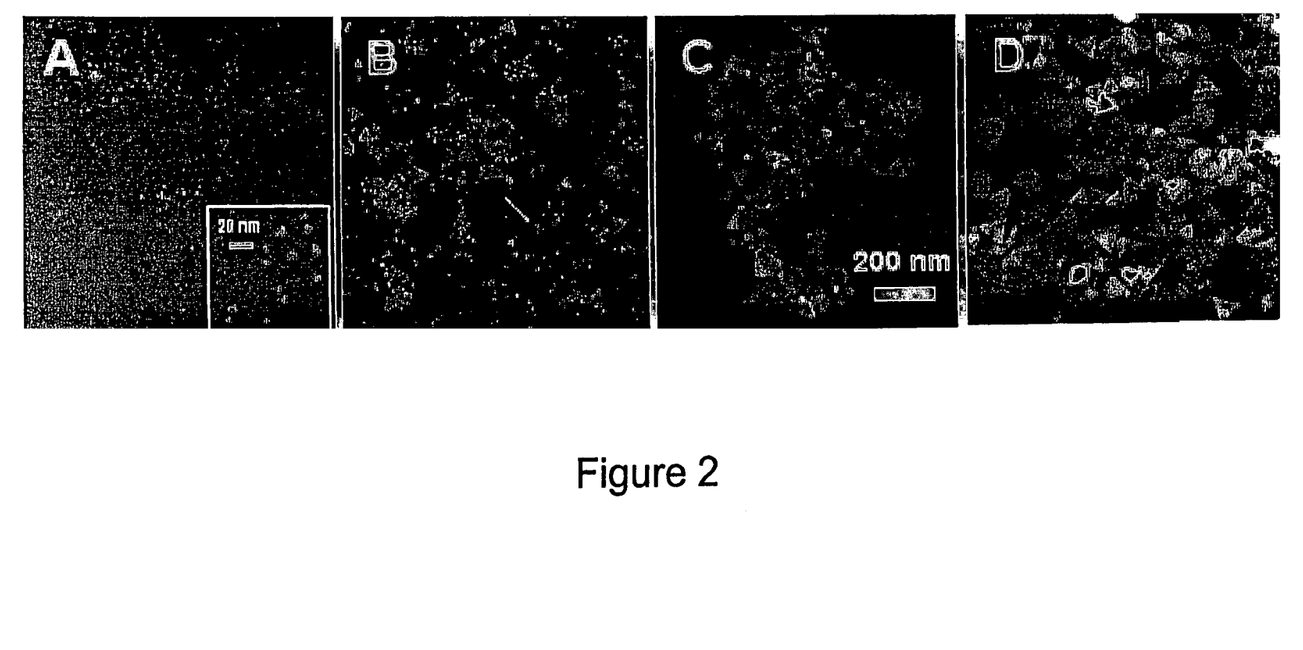
FIG. 2 shows TEM images (reverse print) mapping the morphology changes as a function of irradiation time. (A) before irradiation, (B) after 40 h of irradiation, (C) after 55 h of irradiation, (D) after 70 hr of irradiation. The scale bar is 200 nm for all four images.
Figure 7:
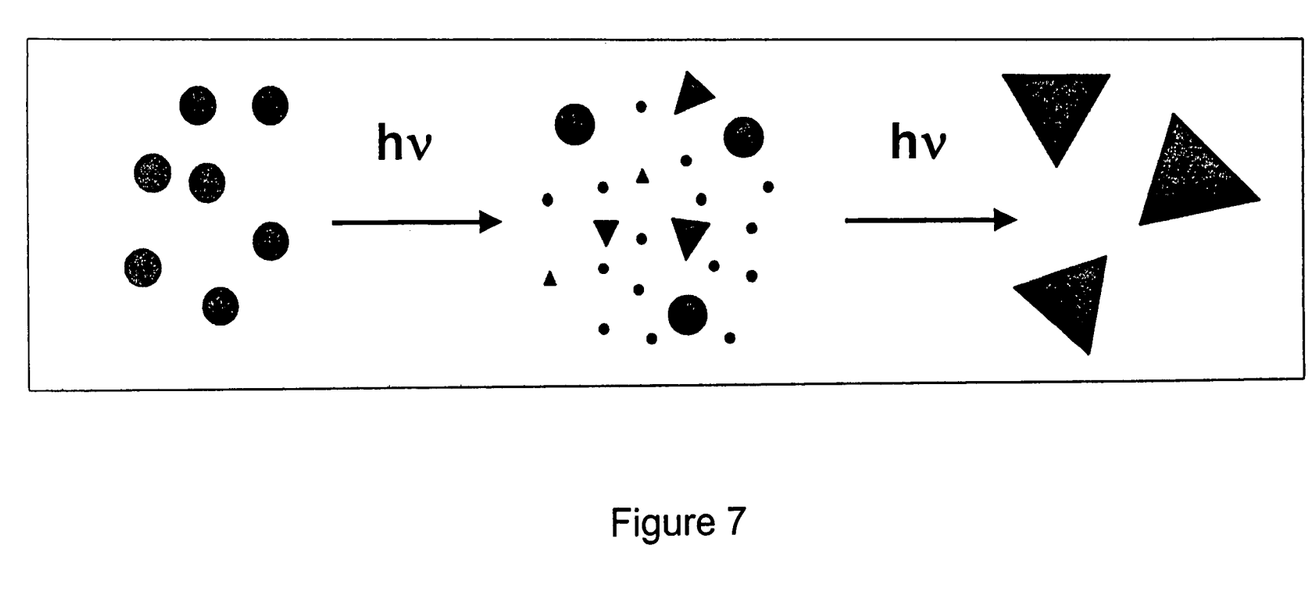
FIG. 7 is a schematic depiction of the formation and growth of the nanoprisms from nanospheres.

Using spectroscopy and electron microscopy, three distinct stages in the conversion of nanospheres to nanoprisms have been identified including induction, growth, and termination, FIG. 1 (inset). Detailed TEM studies reveal that during the induction period, extremely small spherical silver clusters (about 2 to about 4 nm) are formed which are not present in the solution containing the initial spherical particles as shown in FIG. 2B. These silver clusters form from either fragmentation or dissolution of the larger particles. Noteably, photo-induced fragmentation of silver nanoparticles (visible laser at 532 nm) has been observed by Hartland and coworkers (Kamat et al., *J. Phys. Chem. B* 102:3123 (1998)). Nanoprisms form concurrently with the formation of these small clusters. As depicted in FIG. 7, the silver nanoprisms then act as seeds and grow as the small spherical crystals are digested. Once the spherical particles and small nanoclusters are consumed, the reaction terminates. The conversion process can be arrested at any point by stopping the light exposure, thereby providing a means of control over the shape and size of the nanoparticles in suspension. The photo-induced fragmentation of silver particle precursors into small clusters makes the use of light an efficient way to control the growth of the silver nanoprisms. It is important to note that other researchers have used visible lasers, UV, or γ irradiation to prepare spherical silver nanocrystals from silver salts in the presence of organic reducing agents (Henglein, *Langmuir* 17:2329 (2001), Prochazka et al., *Anal. Chem.* 69:5103 (1997)). Typically, photo-induced reduction mechanisms are invoked to describe such processes, however, these mechanisms are in contrast with the growth mechanism proposed herein for the silver nanoprisms where the spherical silver particle precursors begin in the reduced state and are exclusively transformed into nanoprisms via the light-induced fragmentation process.

As shown by transmission electron microscopy (TEM) correlated with the time-dependent spectroscopic observations, the silver nanoprisms evolve from the initial spherical nanoparticles. FIGS. 2A-D shows the initial spherical silver particles (8.01±1.7 nm) are converted over the reaction period to prismatic structures, which appear in two dimensions as triangles. During the initial stages of growth, both spheres and prisms can be observed as shown in FIG. 2B. The latter exhibit edge lengths between about 10 nm and about 60 nm. As shown in FIG. 2C, both the size and population of the silver prisms increase with time with a concomitant decrease in the number of spherical particles. The reaction proceeds to completion and nearly all of the initial spheres (>99%) are converted to the prismatic structures having an edge length of about 100 nm, FIG. 2D.

Figure 3:
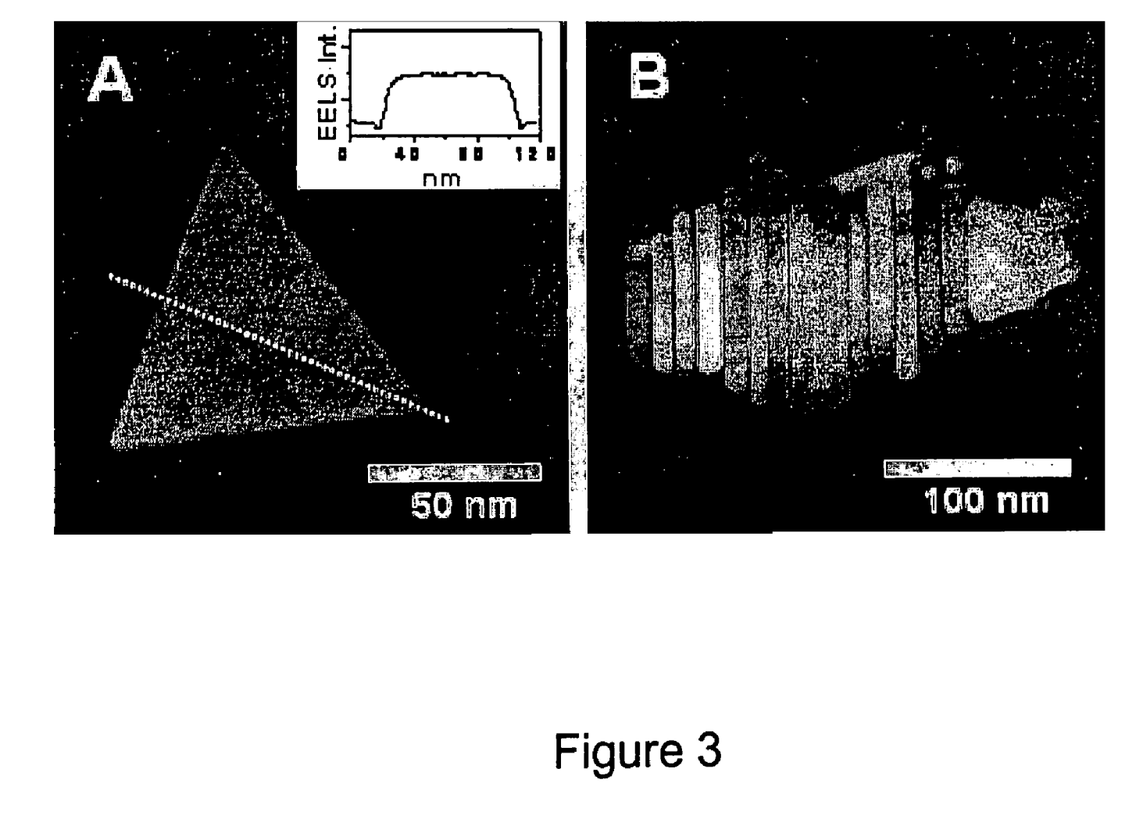
FIG. 3 shows (A) EELS mapping analysis showing the flat-top morphology of the silver nanoprisms; the inset shows the EELS intensity over the line scan. (B) Stacks of silver nanoprisms assembled in a top-to-base manner on a carbon film-coated copper grid.
Figure 4:
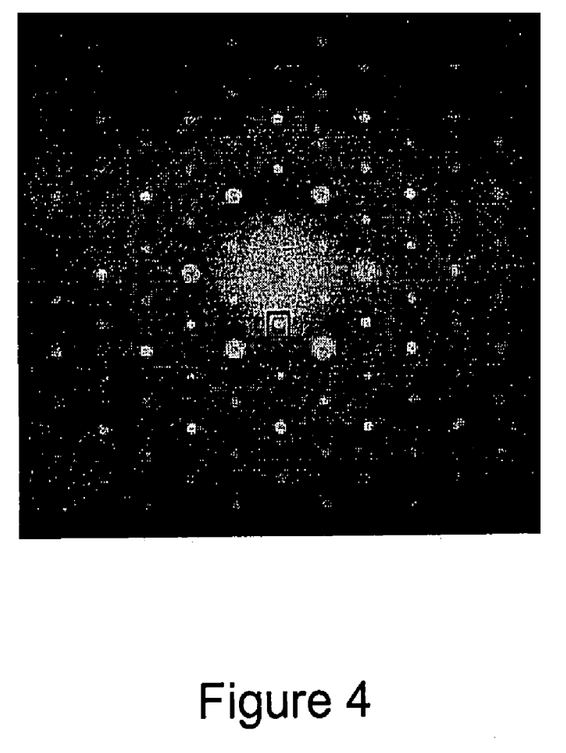
FIG. 4 shows electron diffraction analysis of individual silver nanoprisms. The spot array, diagnostic of a hexagonal structure, is from the [111] orientation of an individual silver nanoprism lying flat on the substrate with its top perpendicular to the electron beam. Based on 3 zone axis analysis (not shown), the crystal structure of the silver nanoprism was determined to be an fcc structure. The intense spots in the [111] zone axis are allowed {220} Bragg reflections (e.g. circled spot) and the sharp weak spot in the center of the triangles formed by the strong spots is indexed as ⅓{422} (e.g. boxed spot).

Another embodiment of the present invention includes the nanoprisms formed by the light-induced photoconversion processes described above. TEM images and electron energy loss spectroscopy analysis (EELS) show that the particles formed in this reaction are indeed silver nanoprisms and not triangular tetrahedra. FIG. 3 shows that each nanoprism has a flat top and bottom (FIG. 3A), and the triangular thickness fringes expected for triangular tetrahedra are not observed in the TEM. Upon the evaporation of solvent, the silver nanoprisms assemble into "stacks" on the TEM grids (FIG. 3B) allowing precise measurement of their thickness (15.6±1.4 nm). These stacks appear as nanorods in the two-dimensional TEM images, but tilting experiments confirm that they are nanoprisms. Significantly, each nanoprism is a single crystal with a lattice spacing of about 1.44 Å, as evidenced by electron diffraction analysis shown in FIG. 4. Detailed TEM investigations (tilting diffraction with 3 zone axis) of individual silver nanoprisms show that the 1.44 Å lattice spacing corresponds to Bragg diffraction from their {220} crystal faces (face-centered cubic). Therefore, the top crystal face of each nanoprism must be (111). Interestingly, an additional set of relatively weak spots in the diffraction pattern, corresponding to 1{422} with a 2.5 Å spacing is also observed. These weak diffraction spots derive from the local hexagonal-like structure observable only for a silver or gold sample that is atomically flat. This is consistent with the structural characterization of these novel particles as thin nanoprisms with atomically flat tops and bottoms.

Figure 5:
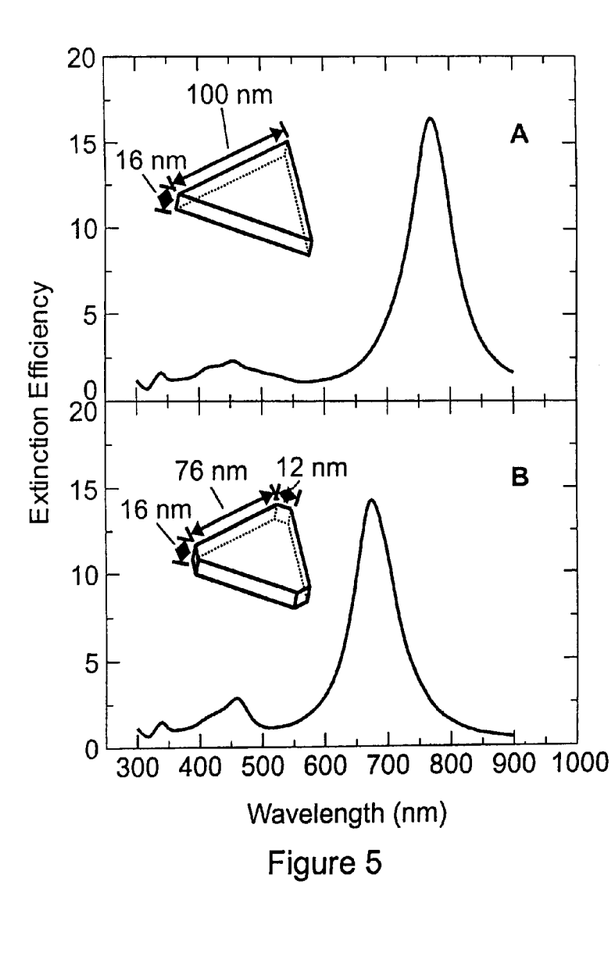
FIG. 5 shows DDA simulations of the orientation averaged extinction efficiency spectra of two silver nanoprisms in water: (A) a perfectly triangular nanoprism, 8512 dipoles are used in the calculations, and (B) a truncated triangular nanoprism, 7920 dipoles are used for the calculation. Dielectric constant data are taken from E. D. Palik, *Handbook of Optical Constants of Solids* (Academic Press, New York, 1985).

The shape and dimensions of the nanoprism depicted in FIG. 5A are average representations of the triangular prisms observed in the TEM images shown in FIG. 2D. Because the nanoprisms have a triangular shape, the large structural anisotropy substantially influences their optical properties (i.e. light-absorption, scattering and SERS). To characterize the extinction spectrum shown in FIG. 1D, Maxwell's equations for light interacting with a triangular prism were solved using a finite element-based method known as the Discrete Dipole Approximation (Yang et al., *J. Chem. Phys.* 103:869 (1995)). Comparing FIGS. 1D and 5A, three bands are observed which qualitatively match the wavelengths of the measured spectra. Examination of the induced polarizations associated with these peaks indicates that the 770 nm peak is the in-plane dipole plasmon resonance, while 470 nm is the in-plane quadrupole resonance, and 340 nm is the out-of-plane quadrupole resonance. The out-of-plane dipole resonance 410 nm and is sufficiently weak and broad that it is barely discernable as a shoulder on the 470 nm peak. Additional calculations indicate that the peak at 770 nm is very sensitive to the sharpness of the tips on the triangles as shown in FIG. 5B. For example, if an about 12 nm region at each tip of a prism is removed, the long wavelength resonance at 770 nm for the perfect prism shifts to 670 nm without significantly changing the other resonances. Referring to FIG. 2B, TEM shows that about 20% of the nanoprisms are truncated. Therefore, these calculations not only allow identification of the important features in the spectrum of the nanoprisms but also the relationship between particle shape and frequency of the bands that make up their spectra.

Figure 6:
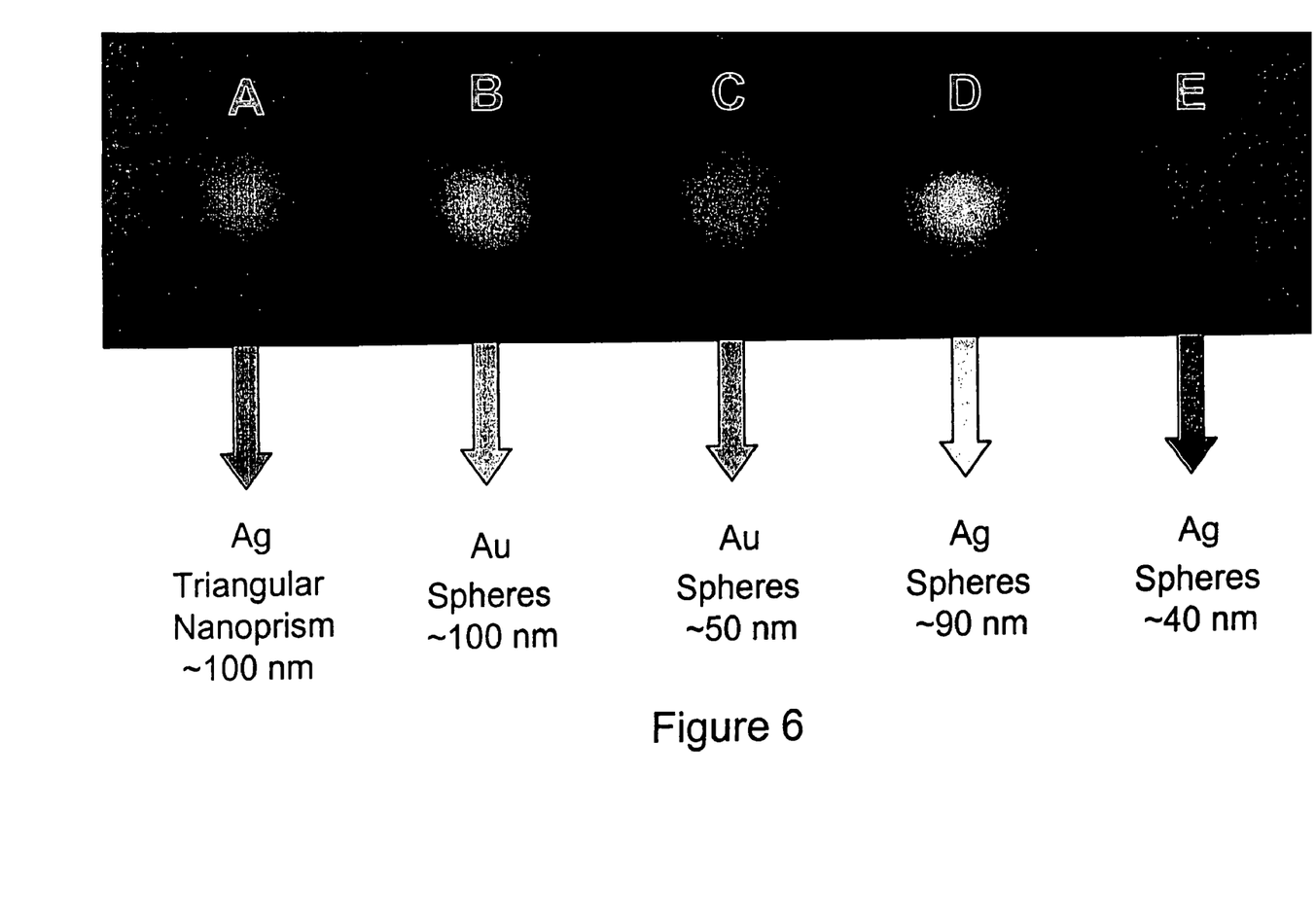
FIG. 6 shows Rayleigh light scattering of particles deposited on a glass slide. The slide is used as a planar waveguide, which is illuminated with a Tungsten source. The image was taken with a digital camera.

The optical properties of these novel nanostructures are striking. For example, these nanoprisms provide the first observation of two distinct quadrupole plasmon resonances for a nanoparticle. Additionally, unlike the spherical particles from which they are derived, and which scatter light in the blue, as shown in FIG. 6A, the nanoprisms of the present invention exhibit Rayleigh scattering in the red. Light scattering of metal nanoparticles probes has already been exploited in the development of many biodiagnostic applications and although conventional spherical particles made of gold or silver do not scatter in the red, their scattering properties can be tailored by adjusting their size and composition as shown in FIGS. 6B-E. Therefore, these novel nanoprisms and their unusual optical properties permit development of multicolor labels based on nanoparticle composition, size and shape.

The nanoparticles can be used as new diagnostic labels, lighting up when target DNA is present. Biodetectors incorporating nanoprisms can be used to quickly, easily and accurately detect biological molecules as well as a wide range of genetic and pathogenic diseases, from genetic markers for cancer and neurodegenerative diseases to HIV and sexually transmitted diseases.

What is claimed is:

1. A method of forming nanoprisms comprising, exposing a suspension of non-crystalline silver nanoparticles to light having a wavelength of less than about 700 nm for greater than 50 hours to form silver nanoprisms having an absorbance at about 670 nm and a unimodal size distribution.

2. The method of claim 1, wherein the light has a wavelength of between about 350 nm to about 700 nm.

3. The method of claim 1, wherein the suspension comprises a reducing agent.

4. The method of claim 3, wherein the reducing agent is $NaBH_4$.

5. The method of claim 1, wherein the suspension comprises a stabilizing agent.

6. The method of claim 5, wherein the stabilizing agent is Bis(p-sulfonatophenyl) phenylphosphine dihydrate dipotassium (BSPP).

7. The method of claim 5, wherein the suspension comprises a surfactant and a ratio of the stabilizing agent to the surfactant is between about 0.01 and about 1.

8. The method of claim 7, wherein the surfactant is trisodium citrate.

9. The method of claim 7, wherein the ratio of the stabilizing agent to the surfactant is about 0.3:1.

10. The method of claim 1, wherein the step of exposing is conducted for a period of at least about 70 hours.

11. The method of claim 1, further comprising, prior to the step of exposing, maintaining the suspension in the absence of light having a wavelength of less than about 700 nm.

12. The method of claim 11, wherein the suspension is maintained for greater than 24 hours in the absence of light having a wavelength less than about 700 nm prior to the step of exposing.

13. The method of claim 1, wherein the suspension comprises $AgNO_3$, $NaBH_4$, BSPP and trisodium citrate, and wherein the ratio of BSPP to trisodium citrate is about 0.3:1, and wherein the light has a wavelength of between about 350 nm and about 700 nm.

14. A method of forming nanoprisms comprising:
   a) fragmenting silver nanoparticles in suspension by exposure to light;
   b) growing silver nanoprisms by continued exposure to light for greater than 50 hours; and
   c) terminating the growth of the silver nanoprisms,
wherein the nanoprisms have an absorbance at about 670 nm and a unimodal size distribution.

15. The method of claim 14, wherein the light has a wavelength of between about 350 nm and about 700 nm.

16. The method of claim 14, wherein the termination step comprises preventing further exposure of the suspension to light.

17. The method of claim 14, wherein the termination step comprises exposing the suspension to light for a time sufficient to consume the silver nanoparticles.

18. The method of claim 14, wherein the suspension comprises a reducing agent.

19. The method of claim 18, wherein the reducing agent is NaBH$_4$.

20. The method of claim 14, wherein the suspension comprises a stabilizing agent.

21. The method of claim 20, wherein the stabilizing agent is Bis(p-sulfonatophenyl) phenylphosphine dihydrate dipotassium (BSPP).

22. The method of claim 20, wherein the suspension comprises a surfactant and a ratio of the stabilizing agent to the surfactant is between about 0.01 and about 1.

23. The method of claim 22, wherein the surfactant is trisodium citrate.

24. The method of claim 22, wherein the ratio of the stabilizing agent to the surfactant is about 0.3:1.

25. The method of claim 14, wherein the step of exposing is conducted for a period of at least about 70 hours.

26. The method of claim 14, further comprising, prior to the step of fragmenting, maintaining the suspension in the absence of light having a wavelength of less than about 700 nm.

27. The method of claim 26, wherein the suspension is maintained for greater than 24 hours in the absence of light having a wavelength less than about 700 nm prior to the step of exposing.

28. The method of claim 14, wherein the suspension comprises AgNO$_3$, NaBH$_4$, BSPP and trisodium citrate, and wherein the ratio of BSPP to trisodium citrate is about 0.3:1, and wherein the light has a wavelength of between about 350 nm and about 700 nm.

* * * * *

UNITED STATES PATENT AND TRADEMARK OFFICE
CERTIFICATE OF CORRECTION

PATENT NO.        : 7,648,595 B2                                               Page 1 of 1
APPLICATION NO.   : 11/499024
DATED             : January 19, 2010
INVENTOR(S)       : Rongchao Jin et al.

It is certified that error appears in the above-identified patent and that said Letters Patent is hereby corrected as shown below:

At col. 1, line 10 insert
                --STATEMENT OF GOVERNMENTAL SUPPORT
      This invention was made with U.S. government support under the National Science Foundation Grant No. CHE-9871903 and Army Research Office (ARO) Grant No. DAAG55-97-1-0133. The government has certain rights in this invention.--

Signed and Sealed this

Sixth Day of April, 2010

David J. Kappos
*Director of the United States Patent and Trademark Office*